United States Patent
Schwenke et al.

(10) Patent No.: US 9,796,362 B2
(45) Date of Patent: Oct. 24, 2017

(54) BUSBAR DESIGNS OPTIMIZED FOR ROBOTIC DISPENSE APPLICATION

(75) Inventors: Robert A. Schwenke, Fowlerville, MI (US); Steven M. Gasworth, Novi, MI (US)

(73) Assignee: EXATEC, LLC, Wixom, MI (US)

(*) Notice: Subject to any disclaimer, the term of this patent is extended or adjusted under 35 U.S.C. 154(b) by 1505 days.

(21) Appl. No.: 11/616,058

(22) Filed: Dec. 26, 2006

(65) Prior Publication Data
US 2007/0151966 A1 Jul. 5, 2007

Related U.S. Application Data
(60) Provisional application No. 60/754,926, filed on Dec. 29, 2005.

(51) Int. Cl.
| | |
|---|---|
| *B60L 1/02* | (2006.01) |
| *H05B 3/16* | (2006.01) |
| *B60S 1/58* | (2006.01) |
| *H05B 3/84* | (2006.01) |
| *H05B 3/86* | (2006.01) |

(52) U.S. Cl.
CPC .......... *B60S 1/586* (2013.01); *H05B 3/84* (2013.01); *H05B 3/86* (2013.01); *H05B 2203/003* (2013.01); *H05B 2203/016* (2013.01); *H05B 2203/017* (2013.01)

(58) Field of Classification Search
CPC .......... B60S 1/586; H05B 2203/003; H05B 2203/016; H05B 2203/017
USPC ............................... 219/203, 522, 543, 547
See application file for complete search history.

(56) References Cited

U.S. PATENT DOCUMENTS

| | | | | |
|---|---|---|---|---|
| 4,102,722 | A * | 7/1978 | Shoop | 156/99 |
| 4,415,196 | A * | 11/1983 | Baum et al. | 296/201 |
| 4,755,659 | A * | 7/1988 | Leon et al. | 219/547 |
| 4,959,270 | A * | 9/1990 | Hasegawa | 428/426 |
| 4,983,814 | A * | 1/1991 | Ohgushi et al. | 219/545 |
| 5,182,431 | A * | 1/1993 | Koontz et al. | 219/203 |
| 5,766,739 | A * | 6/1998 | Funaki et al. | 428/201 |
| 6,008,473 | A | 12/1999 | Gillner et al. | |
| 6,369,369 | B2 * | 4/2002 | Kochman et al. | 219/545 |
| 6,660,968 | B1 * | 12/2003 | Mottelet et al. | 219/203 |
| 6,797,384 | B2 | 9/2004 | Gasworth et al. | |
| 7,129,444 | B2 | 10/2006 | Weiss | |

(Continued)

FOREIGN PATENT DOCUMENTS

| | | |
|---|---|---|
| EP | 0 939 580 A2 | 2/1999 |
| GB | 2061680 A | 5/1981 |

(Continued)

OTHER PUBLICATIONS
Japanese Patent No. 2002042585 (A); Publication Date: Feb. 8, 2002; Machine Translation; 6 Pages.

(Continued)

*Primary Examiner* — Sang Y Paik
(74) *Attorney, Agent, or Firm* — Cantor Colburn LLP

(57) ABSTRACT

A window defroster assembly for use in a motor vehicle includes a transparent panel and a defroster grid integrally formed with the transparent panel by means of a robotic dispensing mechanism. The defroster includes conductive first and second busbars and a plurality of conductive grid lines extending between and connected to the first and second busbars.

13 Claims, 4 Drawing Sheets

(56) References Cited

U.S. PATENT DOCUMENTS

| | | | |
|---|---|---|---|
| 2005/0252908 A1* | 11/2005 | Weiss | 219/522 |
| 2006/0157462 A1* | 7/2006 | Weiss et al. | 219/203 |
| 2007/0045264 A1 | 3/2007 | Nekoda et al. | |
| 2013/0314460 A1 | 11/2013 | Orr | |

FOREIGN PATENT DOCUMENTS

| | | | | |
|---|---|---|---|---|
| GB | 2 091 529 | A | | 7/1982 |
| GB | 2091527 | A | * 7/1982 | 219/203 |
| JP | 56074036 | U | | 11/1982 |
| JP | 60023984 | A | | 2/1985 |
| JP | 62158787 | U | | 8/1987 |
| JP | 04101393 | U | | 1/1992 |
| JP | 2000238254 | | | 9/2000 |
| JP | 2001071285 | | | 3/2001 |
| JP | 2001328254 | | | 11/2001 |
| JP | 2002042585 | A | | 2/2002 |
| WO | WO 03/011607 | A1 | | 2/2003 |
| WO | 2004082934 | A1 | | 9/2004 |
| WO | 2005117494 | | | 12/2005 |

OTHER PUBLICATIONS

Japanese Patent No. 60023984 (A); Publication Date: Feb. 6, 1985; Machine Translation; 5 Pages.

International Preliminary Report on Patentability; International Application No. PCT/US2006/062602; International Filing Date: Dec. 26, 2006; Earliest Priority Date: Dec. 29, 2005; 9 Pages.

International Search Report; International Application No. PCT/US2006/062602; International Filing Date: Dec. 26, 2006; Earliest Priority Date: Dec. 29, 2005; 4 Pages.

Written Opinion of the International Searching Authority; International Application No. PCT/US2006/062602; International Filing Date: Dec. 26, 2006; Earliest Priority Date: Dec. 29, 2005; 5 Pages.

Japanese Patent No. 04101393; Publication Date: Feb. 19, 1991; Machine Translation; 7 Pages.

Japanese Patent No. 56-074036; Publication Date: Nov. 19, 1982; Abstract Only; 1 Page.

JP 2000-077173 A; Machine Translation; 5 pages; 2000.

* cited by examiner

BUSBAR DESIGNS OPTIMIZED FOR ROBOTIC DISPENSE APPLICATION

CROSS REFERENCE TO RELATED APPLICATIONS

This application claims priority to U.S. provisional application Ser. No. 60/754,926 filed Dec. 29, 2005.

BACKGROUND OF THE INVENTION

1. Field of the Invention

The present invention relates to window glazing used in motor vehicles. More specifically, it relates to forming electrical window defrosters on the window glazing.

2. Description of Related Art

In a window defroster, a busbar is used to distribute electrical current to each grid line of the defroster in an attempt to evenly heat the entire defroster grid. As best shown in FIG. 1, conventional defrosters are formed using screen printing techniques where the busbars are filled or solid rectangular reservoirs integrally formed with the grid lines. However, when forming a defroster using robotic printing mechanisms, rather than screen printing techniques, it is quite difficult to produce the filled rectangular reservoirs of the traditional busbar designs.

A defroster may be formed using robotic printing mechanisms by printing directly onto the inner or outer surface of a panel, or on the surface of a protective layer, using a conductive ink or paste and employing various methods known to those skilled in the art. Such methods include, but are not limited to ink jet printing and automatic dispensing. Automatic dispensing techniques known to those skilled in the art of adhesive application include drip & drag, streaming, and simple flow dispensing. Any of the above techniques are best suited for printing comparatively thin, individual line segments of the grid lines.

In view of the above, it is apparent that there exists a need for an improved window defroster design suited for robotic printing techniques.

SUMMARY OF THE INVENTION

In satisfying the above need, as well as overcoming the enumerated drawbacks and other limitations of the related art, the present invention provides a window defroster assembly for use in a motor vehicle. The assembly includes a transparent panel and a window defroster integrally formed with the transparent panel by means of a robotic dispensing mechanism. The defroster includes electrically conductive first and second busbars and a plurality of conductive grid lines extending between and connected to the first and second busbars.

In one embodiment, the first and second busbars are formed as a conductive frame material dispensed as a closed frame subsequently filled with a conductive filler material. In one example of this embodiment, the conductive filler material is the same as the conductive frame material. In another example of this embodiment, the conductive filler material is of a lower viscosity than the conductive frame material. An electrical connection is made at an intersection of each grid line to the closed frame.

In a second embodiment, the first and second busbars are formed as a series of closely spaced substantially parallel busbar lines substantially perpendicular to the grid lines. In one example, all of the grid lines intersect with all of busbar lines. In another example, at least some of the grid lines intersect with less than all of the busbar lines. An electrical connection is made at the intersection of each grid line within a busbar line.

In a third embodiment, the first and second busbars comprise a series of closely spaced interconnected line segments forming a zigzag pattern. In one example, all of the grid lines intersect with all of busbar line segments. In still another example, at least some of the grid lines intersect with less than all of the busbar line segments. As above, an electrical connection is made at each intersection between a grid line and a busbar line segment.

In any of the above embodiments, the transparent panel may be made of glass or may be made of plastic resin.

The present invention further includes a method of forming a window defroster on a transparent panel. The method involves providing a robotic dispensing device, dispensing a conductive ink from the robotic dispensing device to form a first and a second busbar; interconnecting the first and second busbars with a plurality of grid lines, the grid lines being formed of the conductive ink; and creating electrical connections at an intersection of the grid lines to the busbars.

In one example of the above method, the first and second busbars are formed by dispensing the conductive ink as a closed frame; the closed frame being subsequently filled with a conductive filler material. In a second example, the busbars are formed by dispensing the conductive ink in a series of closely spaced, generally parallel busbar lines that are substantially perpendicular to the grid lines. In a third example, the busbars are formed by dispensing the conductive ink in a series of closely spaced interconnected line segments forming a zigzag pattern.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
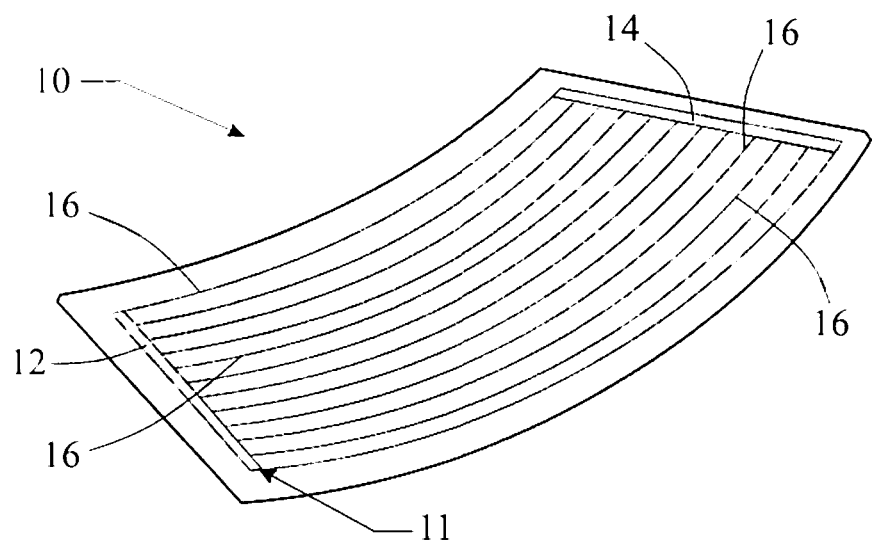
FIG. 1 is a perspective view of a window glazing including a prior art window defroster having screen printed busbar with defroster grid lines.

Referring now to FIG. 1, illustrated therein is a conventional window defroster assembly 10. The conventional window defroster assembly 10 includes a defroster 11 disposed on, for example, a window glazing (e.g. a backlight) of an automobile. The conventional defroster 11 includes conventional busbars 12 and 14 and conventional grid lines 16. Busbars 12 and 14 are configured to distribute electrical current through each of the grid lines 16. Typically, a screen printing process is used to form the pattern of the conventional busbars 12 and 14 and conventional grid lines 22. As such, the busbars 12 and 14 are formed in a single printing pass as solid, wide strips, generally perpendicular to the grid lines.

Figure 2:
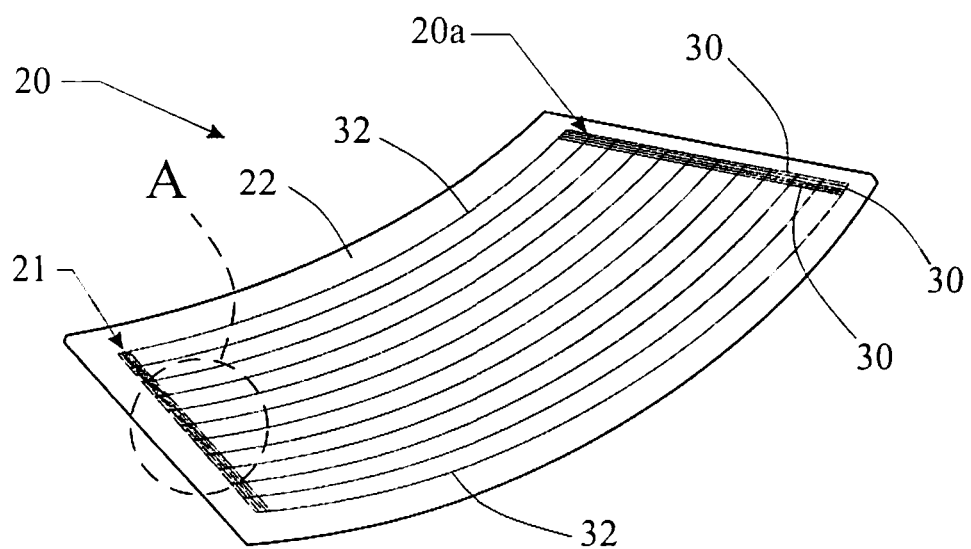
FIG. 2 is a perspective view of a window glazing including a window defroster according to the present invention.

Referring now to FIG. 2, a window defroster assembly embodying the principles of the present invention is illustrated therein and designated at 20. Similar to the conventional window defroster assembly 10, the assembly 20 of the present invention includes a transparent panel 22 (e.g. a backlight) of an automobile and a defroster grid 21. Various embodiments of the present invention are optimized for rapid printing by a robotic mechanism, using conductive ink or a similar substance, onto a glass or plastic panel forming the window glazing 22. Alternative designs 21a, 21b, and 21c of the defroster grid 21 are more fully described below and include (1) a parallel line busbar 26 illustrated in FIGS. 2 and 3a, (2) a filled busbar frame 24 illustrated in FIG. 3b, and (3) an interconnected zigzag busbar 28 illustrated in FIG. 3c.

The panel 22, if formed of glass, may be any conventional glass known in the art and, if formed of plastic, may be any transparent plastic including, for example, thermoplastic polymeric resin or a mixture or combination thereof, such as the types disclosed in U.S. Pat. No. 6,797,384, which is fully herein incorporated by reference. Other appropriate thermoplastic resins include, but are not limited to, polycarbonate resins, acrylic resins, polyarylate resins, polyester resins, and polysulfone resins, as well as copolymers and mixtures thereof. The plastic may be formed into a window shape through the use of any of the various known techniques, such as molding, thermoforming, or extrusion.

In its final construction, the panel 22 may be protected from such natural occurrences as exposure to ultraviolet radiation, oxidation, and abrasion through the use of a single protective layer or additional, optional protective layers, both on the exterior side and/or interior side of the panel. As the term is used herein, a transparent panel with at least one protective layer is defined as a transparent glazing panel.

The protective layers may be of known varieties, and with a plastic panel 22 may be a plastic film, an organic coating, an inorganic coating, or a mixture thereof. The plastic film may be of the same or different composition as the transparent panel 22. The film and coatings may comprise ultraviolet absorber (UVA) molecules, rheology control additives, such as dispersants, surfactants, and transparent fillers (e.g., silica, aluminum oxide, etc.) to enhance abrasion resistance, as well as other additives to modify optical, chemical, or physical properties. Examples of organic coatings include, but are not limited to, urethanes, epoxides, and acrylates and mixtures or blends thereof. Some examples of inorganic coatings include silicones, aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, silicon carbide, tantalum oxide, titanium oxide, tin oxide, indium tin oxide, yttrium oxide, zinc oxide, zinc selenide, zinc sulfide, zirconium oxide, zirconium titanate, or glass, and mixtures or blends thereof.

The protective coatings applied as protective layers may be applied by any suitable technique known to those skilled in the art. These techniques include deposition from reactive species, such as those employed in vacuum-assisted deposition processes, and atmospheric coating processes, such as those used to apply sol-gel coatings to substrates. Examples of vacuum-assisted deposition processes include but are not limited to plasma enhanced chemical vapor deposition, ion assisted plasma deposition, magnetron sputtering, electron beam evaporation, and ion beam sputtering. Examples of atmospheric coating processes include but are not limited to curtain coating, spray coating, spin coating, dip coating, and flow coating.

As an illustrative example, a polycarbonate panel comprising the Exatec® 900 automotive window glazing system (Exatec LLC, Wixom, Mich.) with a printed defroster generally corresponds to the embodiment of FIG. 2. In this particular case, the transparent polycarbonate panel is protected with a multilayer coating system (Exatec® SHP-9X, Exatec® SHX, and a deposited layer of a "glass-like" coating ($SiO_xC_yH_z$) that is then printed with a defroster grid on the exposed surface of the protective layer facing the interior of the vehicle. As a further alternative construction, the defroster grid may be placed on top of a layer or layers of a protective coating or coatings and then over-coated with an additional layer or layers of a protective coating or coatings. For instance, the defroster grid may be placed on top of a silicone protective coating (e.g., AS4000, GE Silicones) and subsequently over-coated with a "glass-like" film.

Figure 3A:
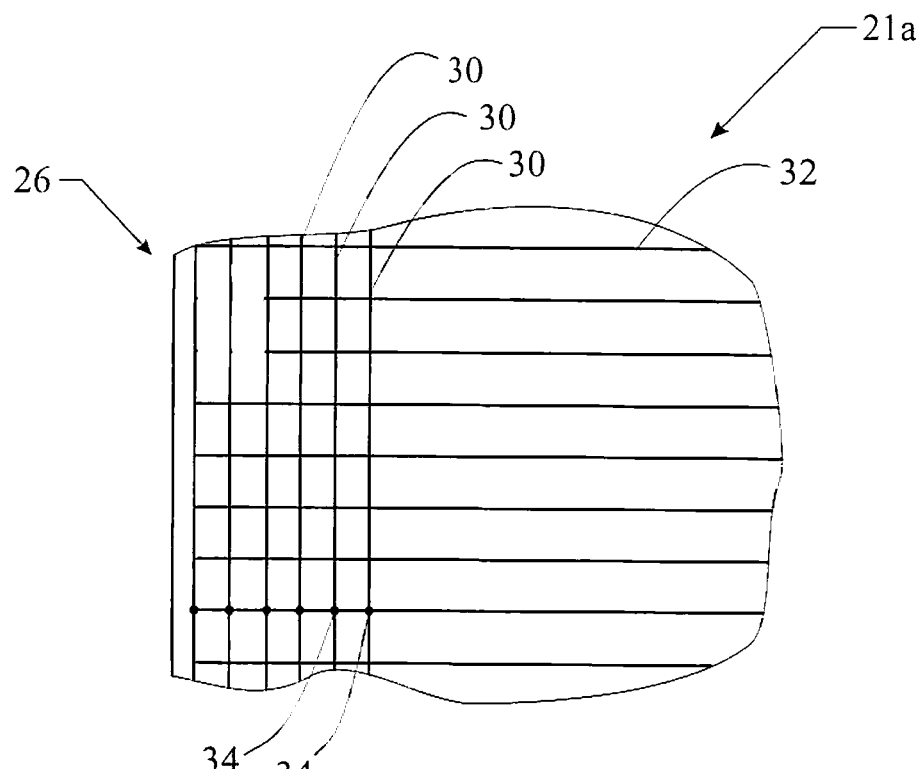
FIG. 3a is a schematic of a portion of a busbar formed by printing a series of closely spaced parallel lines.

Turning now to the present invention, FIGS. 2 and 3a show the first alternative defroster grid 21a. This defroster grid 21a includes a busbar 26 defined by dispensing conductive ink to form a series of closely spaced parallel busbar lines 30. The busbar lines 30 may, for example, be dispensed in a direction substantially perpendicular to the grid lines 32 so as to extend the full length of the busbars. In one example, the grid lines 32 are dispensed to intersect with each of the busbar lines 30 at a plurality of electrical connections 34, in a grid-like pattern. (As illustrated, the "dots" of the electrical connections 34 are provided solely for illustration and the electrical connections 34 need not form "dots".) The busbar lines 30 and the heater grid lines 32 can be of the same or different widths and heights (thickness). In order to establish an effective electrical connection to the busbar lines 30 and an efficient distribution of electrical current throughout the busbar lines 30 and the grid lines 32, the electrical connections 34 should be provided at every intersection of a busbar line 30 and a grid line 32. However, in some examples it may be desirable for some of the grid lines 32 to intersect less than all of the busbar lines 30 to regulate the current in some of the grid lines 32 compared to other grid lines 32. This is shown in the upper portion of FIG. 3a.

Figure 3B:
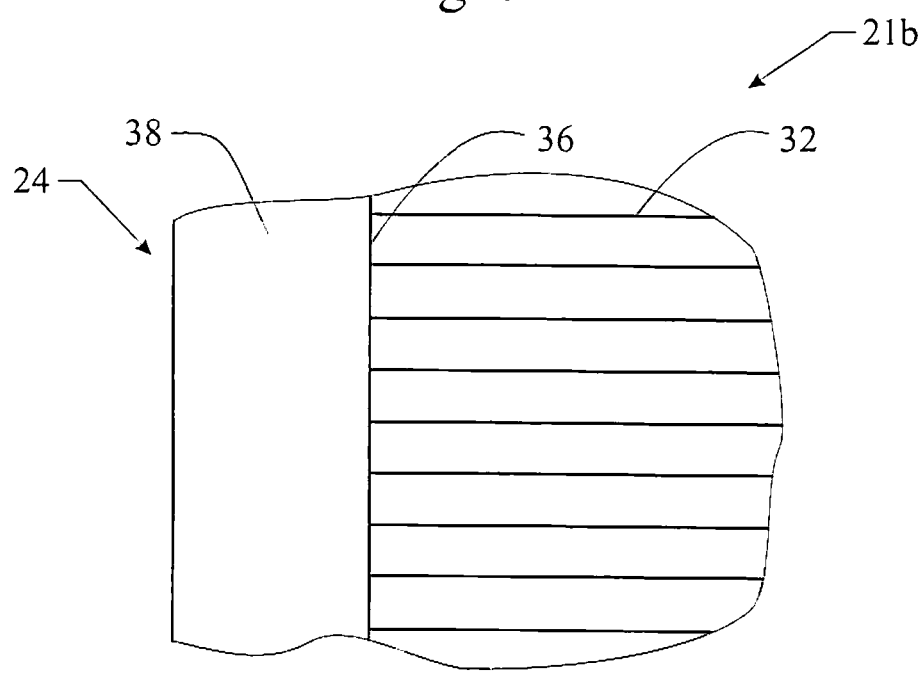
FIG. 3b is a schematic of a portion of a busbar formed by printing a rectangular frame that is subsequently filled.

Referring now to FIG. 3b, the second alternative defroster grid 21b is shown. This defroster grid 21b includes a filled busbar frame 24 connected to the grid lines 32. The filled busbar frame 24 is formed by dispensing a conductive ink to form a closed frame 36 and then filling the area bounded therein with a conductive filler material 38. The conductive filler material 38 may be of the same or different composition and exhibit the same or different Theological properties as the conductive material used to dispense the frame 36. For example, the conductive filler material 38 may exhibit a lower viscosity, (i.e., be more easily flowable) than the conductive frame material in order to facilitate the complete filling of the area bounded by the frame 36. Finally, the plurality of grid lines 32 are dispensed and end upon intersection with the filled busbar frame 24.

Figure 3C:
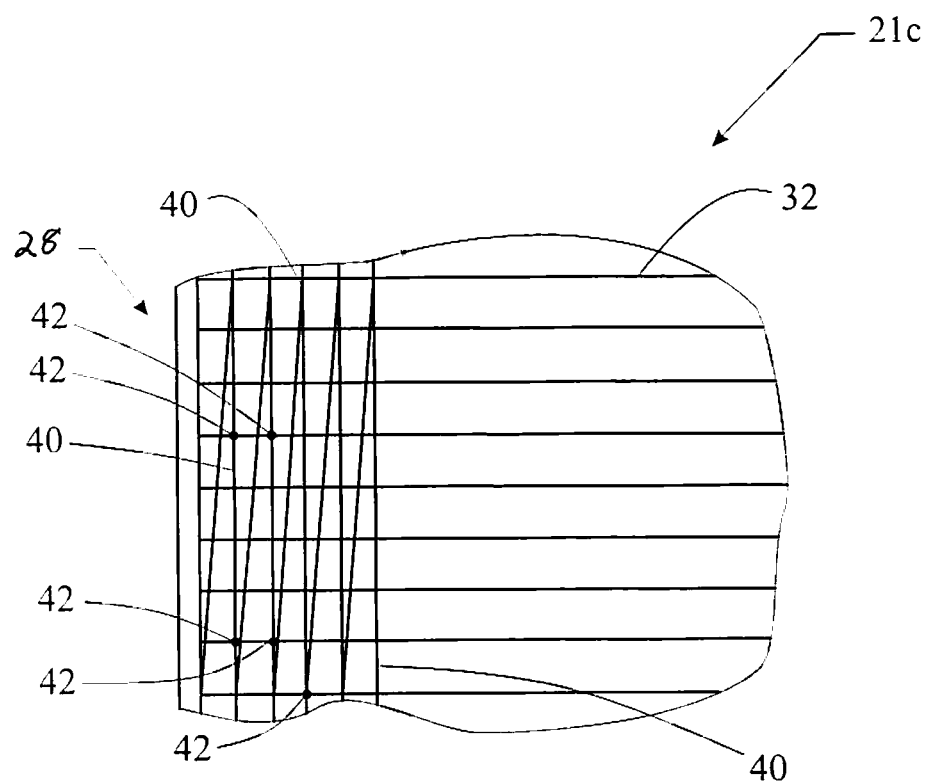
FIG. 3c is a schematic of a portion of a busbar formed by printing a series of closely spaced interconnected line segments running back and forth in zig-zag fashion across the busbar.

Turning to FIG. 3c, the third alternative defroster grid 21c is shown. This window defroster includes a busbar 28 defined by dispensing conductive ink to form the busbar 28 as a series of closely spaced line segments, each of which extends diagonally between two adjacent parallel busbar line segments 40. As such, the series of line segments are interconnected with the busbar line segments 40 attached in an alternating manner to form a zigzag pattern. The main benefit of this approach is the ability to increase the dispensing rate since the robot need not stop after the deposition of each busbar line segment 40. Essentially, the busbar line segments 40 of this embodiment form one long line instead of multiple individual lines. As above, the grid lines 32 are dispensed to intersect with each of the busbar line segments 40 at a plurality of electrical connections 42, in a grid-like pattern. In order to establish an efficient distribution of electrical current throughout the grid lines 32, the electrical connections 42 should be provided at every intersection of a busbar line segment 40 and a grid line 32. However, similar to the parallel line busbar 26 described above, it may be desirable for some of the grid lines 32 to intersect less than all of the busbar line segments 40 to regulate the current in some of the grid lines 32 compared to other grid lines 32.

The amount of electrical current flowing through each grid line 32 can be adjusted by varying the number of busbar lines 30 or line segments 40 and grid line 32 intersects. For example, a grid line 32 intersecting with only three busbar lines 30, 40 will carry about 50% of the current provided to a grid line 32 intersecting six busbar lines 30, 40 provided that each busbar line 30, 40 and grid line 32 are of similar width and height. This technique allows the designer of a heater grid increased freedom in evenly distributing the electrical current across the grid lines. This is particularly useful since the shape of the window often dictates the length of the grid lines, which can result in grid lines of differing lengths having differing current requirements. For each line, the electrical current flowing through each grid line may also be varied by altering the width and height of each busbar line 30, 40.

Figure 4:
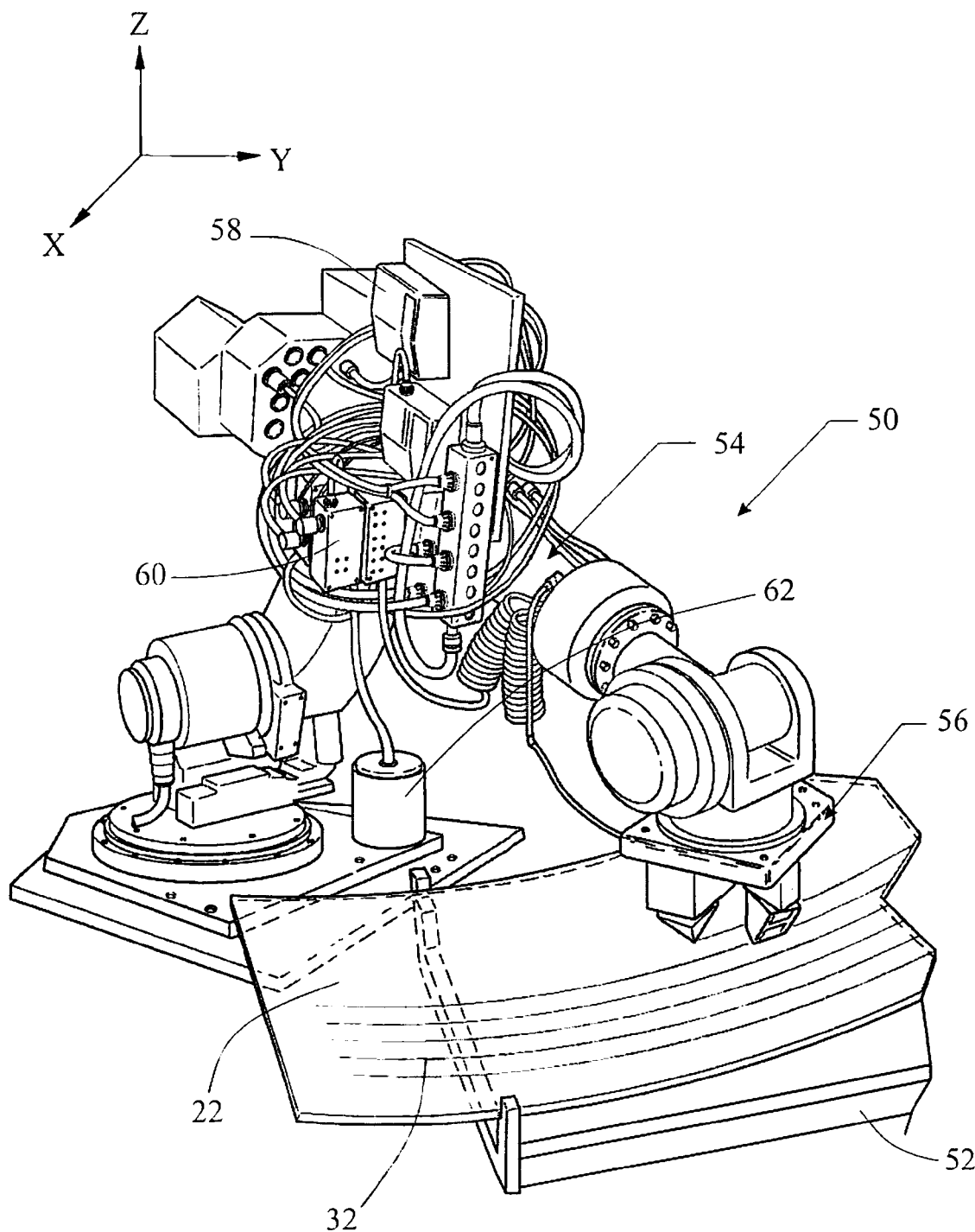
FIG. 4 is a perspective view of one embodiment of a robotic dispensing device printing a window defroster according to the present invention.

The present invention is envisioned as particularly appropriate for use with an automated or robotic dispensing mechanism as shown in FIG. 4. One non-limiting example of such a mechanism is disclosed in U.S. patent application Ser. No. 11/321,567 filed Dec. 29, 2005 which is herein incorporated by reference.

FIG. 4 illustrates a robotic dispending mechanism 50, which may be a robotic arm or other device, for dispensing conductive ink to form, for example, the series of heater grid lines 32 and various busbars 24, 26 and 28 upon the panel 22 which may be resting on a support 52. The mechanism 50 illustrated in the figure includes a robot arm 54, mounted in a stationary manner to a support surface, and a dispensing head 56 attached to the end of the robot arm 54. A controller 58 is electrically coupled to the robot arm 54. The dispensing head 56 and a flow regulator 60 are fluidly coupled to a conductive ink source 62. The robot arm 54 is articulatable and capable of moving the dispensing head 56 to any point on the surface of the panel 22. In a preferred operation, the robot arm 54 moves the dispensing head 56 in a linear direction across the panel 22 and the dispensing head dispenses the conductive ink from the source 62 onto the panel 22 in lines, forming the various busbar embodiments 24, 26 and 28 and the heater grid lines 32 (only some of which are shown in FIG. 4 for clarity). While this is an exemplary embodiment, other examples may dispense the heater grid lines 32 and busbars 24, 26 and 28 using other appropriate robotic mechanisms.

The present invention also includes a method of forming a window defroster on a transparent panel. The method includes providing a robotic dispensing mechanism; dispensing a conductive ink from the robotic dispensing mechanism to form a first and a second busbar; interconnecting the first and second busbars with a plurality of grid lines formed of the conductive ink; creating electrical connections at an intersection of the grid line to the busbars. One example may further include forming the first and second busbars by dispensing the conductive ink as a closed frame filled with a conductive filler material. Another example may include forming the busbars by dispensing the conductive ink in a series of closely spaced substantially parallel busbar lines substantially perpendicular to the grid lines. Yet another example may include forming the busbars by dispensing the conductive ink in a series of closely spaced, interconnected and alternating line segments forming a zigzag pattern.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A window defroster assembly for use in a motor vehicle, the assembly comprising:
    a transparent glazing panel having a protective layer and a conductive ink in the form of a window defroster grid integrally formed with the transparent glazing panel, wherein the defroster grid includes electrically conductive first and second busbars and a plurality of electrically conductive grid lines extending between and connected to the first and second busbars, wherein the first and second busbars comprise a series of substantially parallel busbar lines, the parallel busbar lines extending the full length of the busbars and forming ends thereof;
    wherein the first and second busbars further comprise a series of line segments, each line segment extending diagonally between and diagonally connecting two adjacent ones of the parallel busbar lines and crossing at least one of the grid lines, whereby the series of line segments form in combination with the parallel busbar lines a zigzag pattern.

2. The window defroster assembly of claim 1 wherein the grid lines are arranged substantially perpendicular to the busbar lines.

3. The window defroster assembly of claim 1 wherein all of the grid lines intersect with all of busbar lines.

4. The window defroster assembly of claim 1 wherein at least some of the grid lines intersect with less than all of the busbar lines.

5. The window defroster assembly of claim 1 wherein an electrical connection is made at each intersection of a grid line to a busbar line.

6. The window defroster assembly of claim 1 wherein all of the grid lines intersect with all of line segments.

7. The window defroster assembly of claim 1 wherein at least some of the grid lines intersect with less than all of the line segments.

8. The window defroster assembly of claim 1 wherein an electrical connection is made at an intersection of each grid line to each line segment.

9. The window defroster assembly of claim 1 wherein the transparent panel is made of one of glass and plastic resin.

10. The window defroster assembly of claim 9 wherein the plastic resin includes one selected from the group consisting of polycarbonate resins, acrylic resins, polyarylate resins, polyester resins, and polysulfone resins, as well as copolymers and mixtures thereof.

11. The window defroster assembly of claim 1 wherein the protective layer is selected from the group of a plastic film, an organic coating, an inorganic coating, or a mixture thereof.

12. A window defroster assembly for use in a motor vehicle, the assembly comprising:
a transparent glazing panel having a protective layer and a conductive ink in the form of a window defroster grid integrally formed with the transparent glazing panel, wherein the defroster grid includes electrically conductive first and second busbars and a plurality of electrically conductive grid lines extending between and connected to the first and second busbars, wherein the first and second busbars comprise a series of substantially parallel busbar lines and a series of line segments, wherein the parallel busbar lines extend the full length of the busbars and, wherein each line segment extends diagonally between and connects two of the parallel busbar lines and crosses at least one of the grid lines, whereby the series of line segments form in combination with the busbar lines a zigzag pattern.

13. The window defroster assembly of claim 12 wherein the series of line segments form in combination with the parallel busbar lines a zigzag pattern.

* * * * *